Patented Feb. 23, 1954

2,670,380

UNITED STATES PATENT OFFICE 2,670,380

OXIDATION OF OLEFINS

David James Hadley, Epsom Downs, England, assignor to The Distillers Company Limited, Edinburgh, Scotland, a British company No Drawing. Application March 27, 1950, Serial No. 152,273

Claims priority, application Great Britain April 8, 1949

8 Claims. (Cl. 260—604)

The present invention relates to a process for the oxidation of olefines of the general formula

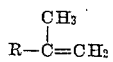

in which R is a hydrogen atom or saturated alkyl group, particularly of propylene and isobutene, and the production thereby of the corresponding unsaturated aldehydes, in particular acrolein and methacrolein.

In copending application Ser. No. 110,028, filed August 12, 1949 (now U. S. Patent No. 2,593,437), there have been described processes for the oxidation by means of molecular oxygen, of propylene and isobutene, which comprise passing said gas mixtures at temperatures between 180° and 400° C. in the presence of elementary selenium over a contact mass which contains initially copper and/or cuprous oxide and/or cupric oxide. The selenium can be introduced as vapour or produced in situ by the decomposition under reaction conditions of decomposable selenides. These solid components of the catalytically acting contact mass may be distributed on carriers. As such carriers, activated silica gel and activated alumina have proved of particular value. When copper and/or the oxides of copper are distributed on activated alumina and this solid mixture is subjected to a heat treatment at an elevated temperature, the copper combines with the alumina to form copper aluminate, as set forth in the further copending application Ser. No. 97,486, filed June 6, 1949 (now abandoned). This copper aluminate acts in conjunction with elementary selenium as an efficient catalyst for the oxidation of said olefines and especially for the production of acrolein and methacrolein from propylene and isobutene respectively.

It has now been discovered that, besides copper metal, the oxides, and the aluminate of copper, other copper compounds may be used as contact material for the oxidation of olefins of the above configuration and in particular in the preparation of acrolein from propylene and of methacrolein from isobutene, when applied in the presence in the reaction zone of elementary selenium.

Accordingly, the process of the invention for the oxidation of olefines of the general formula

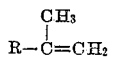

and the manufacture thereby of unsaturated aldehydes comprises passing said olefines with molecular oxygen at temperatures between 180° C. and 400° C. in the presence of elementary selenium over a contact mass containing copper compounds other than its oxides, aluminate and silicate which are stable under the reaction conditions.

Copper compounds which are not decomposed to any substantial extent under the reaction conditions are for instance, chromate, molybdate, sulphate, tungstate and vanadate.

The copper compounds used according to this invention may be distributed upon carriers such as pumice, asbestos, silica gel and alumina, in order to obtain a large area of active surface. In cases where the distribution upon carriers meets with difficulties, for instance, with the tungstate, vanadate or molybdate of copper, it is preferred to apply the said compounds in the form of pellets.

The elementary selenium acting in conjunction with the copper compounds as catalyst for the oxidation of the olefines and the production thereby of unsaturated aldehydes may be added to the mixture of gaseous reactants in the form of vapour or it may be generated in situ by the dissociation or decomposition of selenides, which were added to the contact mass containing the said copper compounds. Suitable selenides are, for instance, the selenides of silver, antimony and cobalt. When the selenium is supplied in the form of vapour admixed with the gaseous reactants, it is expedient to pass part or the whole of the olefine-oxygen mixture or even part or the whole of the olefines only over the heated selenium. By adjusting the temperature at which the gas or the gas mixture is passed over the selenium and/or by regulating the amount of gas passed over the selenium, the amount of selenium in the gas mixture may be regulated as desired.

The selenium may also be mixed in an elementary form with the solid contact material before it is used as catalyst in the reactor. In this case, an excess of selenium has to be added. When the selenium is added in the vapour form to the gaseous reactants its amount can vary within wide limits and depends to a certain extent on the kind of the solid contact mass used and the olefine to be oxidised, but the amount is not critical. Thus, for instance, 0.02 to 0.2 gram in 100 litres of a gas mixture consisting of 2% by volume of propylene in air gave good results. For the oxidation of isobutene in a similar concentration in air 0.02 to 0.08 gram of selenium per 100 litres of gas, measured in both cases at room temperature, is preferred. To increase the concentration above the upper limits mentioned does not lead to any substantial improvement in the yield of the desired unsaturated aldehyde, whilst concentrations below the lower limits still have a marked beneficial effect in promoting the formation of unsaturated aldehydes and suppressing the formation of carbon oxides during the reaction.

The molecular oxygen used for carrying out the oxidation process may be in the form of pure oxygen, commercial oxygen or air. As the olefines form explosive mixtures with oxygen it has been found convenient to use gas mixtures in which the percentage of olefine is less than that corresponding to the lower explosion limit in order to obviate or minimise the explosion hazards. A suitable ratio for effectively carrying out the process of the invention is, in the case of propylene for instance, a mixture of 2 parts by volume of the olefine in 98 parts by volume of air. As an alternative to the nitrogen contained in the air, other inert gases or vapours may be added to the gaseous reactants. Such inert additions are, for instance, carbon dioxide and steam, which offer the advantage that they can easily be removed from the gaseous reaction mixture by scrubbing with alkali solutions or by condensation respectively, when it is desired to recycle any unreacted olefine.

The temperature range in which the oxidising reaction is carried out with advantage is from 180° to 400° C., preferably from 275° to 350° C.

In some cases the activity of the solid contact material is beneficially affected by subjecting said materials, preferably when distributed upon a support, to a heat treatment. This heat treatment is applicable only in such cases where the copper compounds are not decomposed to any large extent under the prevailing conditions. Suitable temperatures are for instance between 200° and 600° C. and may be ascertained by a simple test.

The process of the invention may be carried out by conducting the mixture of olefine and elementary oxygen containing gases in conjunction with elementary selenium in a single pass over the solid contact material, or it may be carried out as a continuous process. In the last case, part of the gas mixture leaving the reactor is vented after it has been freed from the desired reaction products and also from the selenium contained therein, whilst the remaining gas mixture is recirculated through the reactor after the olefine and the molecular oxygen have been suitably replenished. In this way use may be made of the selenium and the selenium compounds which have escaped condensation in the cooler parts of the reaction equipment. The recycling process in addition reduces the quantity of selenium which has to be removed from the gas mixture finally going to waste after the unsaturated aldehyde has been recovered therefrom. This is important since selenium left in the gas going to waste creates a nuisance on account of its disagreeable smell and its toxicity. The reaction by a single pass is of advantage when the percentage of unreacted olefine in the gas mixture leaving the reactor is small.

The unsaturated aldehydes produced by the process according to this invention are recovered from the gaseous reaction mixture, for instance by scrubbing with water, preferably after suitable cooling.

The following examples illustrate the manner in which the process of the invention may be carried out in practice:

*Example 1*

A solution of 100 grams $CuSO_4$ in 40 cc. of water was heated to 80° C. and poured on to 50 grams 8–16 mesh activated alumina also heated to 80° C. Excess liquid was drained off and the catalyst was dried at 100° C. 8 grams of the catalyst was placed in a helical reactor of Pyrex glass (registered trade-mark) of 6 mm. bore which was heated in a liquid bath at 320° C. 25 litres per hour of a mixture of 2% by volume of propylene with air was passed over the surface of a pool of molten selenium and then through the catalyst. By the use of a selenium container which offers a surface of about 6 square centimetres and is maintained at about 320° C., about 0.02 gram per hour of selenium was evaporated.

62% of the propylene was converted to acrolein and 17% to $CO_2$ and $H_2O$.

*Example 2*

59 grams of ammonium vanadate was dissolved in 2,000 cc. warm water and to it was added with stirring a solution of 60 grams $$Cu(NO_3)_2 3H_2O$$

in 100 cc. water. The resulting precipitate was filtered off under suction, washed and dried at 100° C. The dried mass was crushed to pass an 18 mesh sieve, and after the addition of 1% graphite as a lubricant, compressed into pellets ⅛ inch diameter by ⅛ inch long. The catalyst was used for the oxidation of propylene as in Example 1.

23% of the propylene was converted to acrolein and 37% to $CO_2$.

*Example 3*

Copper tungstate was prepared by mixing the following solutions:

33 grams sodium tungstate in 100 cc. water
24 grams $Cu(NO_3)_2.3H_2O$ in 100 cc. water The precipitated copper tungstate was filtered off under suction, dried at 100° C. and ground to pass an 18 mesh sieve. The catalyst was mixed with 5% of its own weight of graphite and was then compressed into pellets ⅛ inch diameter by ⅛ inch long.

It was tested as a catalyst for the oxidation of propylene as in Example 1.

7% of the propylene was converted to acrolein and about 1% to $CO_2$ and $H_2O$.

*Example 4*

Copper chromate was prepared by adding 24 grams solid $CuCO_3$ slowly to a solution of 42 grams of chromium trioxide in 30 cc. of water, and heating under reflux for one hour; the precipitate was filtered, washed, ground, dried and tabletted. This catalyst was used for the oxidation of propylene as in Example 1.

31% of the propylene was converted into acrolein and 22% to $CO_2$.

*Example 5*

Copper molybdate was prepared by mixing solutions of 40 grams sodium molybdate in 50 cc. of water and 40 grams $CuSO_4$ in 50 cc. water; the light green precipitate was filtered, washed, dried and tabletted. It was used for the oxidation of propylene as in Example 1.

26% of propylene was converted into acrolein and 19% to $CO_2$.

By replacing in the preceding examples the propylene by isobutene or any other olefine of the defined configuration but otherwise operating under similar conditions, the corresponding unsaturated aldehydes are obtained successfully.

It is to be understood that the copper halides and copper sulphides which are not stable under the reaction conditions are not included amongst the effective contact materials claimed.

I claim:

1. Process for the oxidation of olefines of the general formula

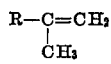

wherein R is selected from the group consisting of hydrogen and saturated alkyl radicals and the manufacture thereby of unsaturated aldehydes which comprises reacting molecular oxygen at temperatures between 180° C. and 400° C. in the presence in the reaction zone of elementary selenium and a solid contact material selected from the group consisting of copper molybdate, copper chromate, copper sulphate, copper tungstate and copper vanadate.

2. A process as set forth in claim 1 wherein the olefine to be oxidised is propylene.

3. A process as set forth in claim 1 wherein the olefine to be oxidised is isobutene.

4. A process as set forth in claim 1 which comprises subjecting the copper containing solid contact material preliminarily before its use to a heat treatment at elevated temperatures.

5. A process as set forth in claim 1 which comprises introducing the elementary selenium into the reactor in the form of vapour.

6. A process as set forth in claim 1 which comprises generating the elementary selenium from metal selenides which decompose under the reaction conditions with the liberation of free selenium and which have been admixed to the copper containing contact material.

7. A process as set forth in claim 1 in which the copper compound is distributed on a carrier.

8. A process as set forth in claim 1 wherein the molecular oxygen is in excess relative to the olefine.

DAVID JAMES HADLEY.

References Cited in the file of this patent

UNITED STATES PATENTS

| Number | Name | Date |
| --- | --- | --- |
| 1,955,829 | Pier et al. | Apr. 24, 1934 |
| 2,020,671 | Dreyfus | Nov. 12, 1935 |
| 2,060,086 | Kautter | Nov. 10, 1936 |
| 2,129,732 | Fulton et al. | Sept. 13, 1938 |
| 2,161,066 | La Lande, Jr. | June 6, 1939 |
| 2,270,090 | Thomas | Jan. 13, 1942 |
| 2,280,650 | Kassel | Apr. 21, 1942 |
| 2,366,724 | Gardner | Jan. 9, 1945 |
| 2,366,725 | Gardner | Jan. 9, 1945 |
| 2,383,711 | Clark et al. | Aug. 28, 1945 |
| 2,451,485 | Hearne | Oct. 19, 1948 |

FOREIGN PATENTS

| Number | Country | Date |
| --- | --- | --- |
| 625,330 | Great Britain | June 27, 1949 |